United States Patent Office 3,755,443
Patented Aug. 28, 1973

3,755,443
4,4'-ALKYLENE BIS(SEMICARBAZIDE) AND DERIVATIVES THEREOF
Chester Stephen Sheppard and Ronald Edward MacLeay, Tonawanda, N.Y., assignors to Pennwalt Corporation, East Orange, N.J.
No Drawing. Original application June 9, 1966, Ser. No. 556,263, now Patent No. 3,585,200, dated June 15, 1971. Divided and this application June 22, 1970, Ser. No. 59,808
Int. Cl. C07c *121/20, 133/02*
U.S. Cl. 260—554  1 Claim

ABSTRACT OF THE DISCLOSURE

The compound 4,4'-ethylene bis(semicarbazide) is prepared, said compound being utile in polymer formation.

This is a division of application Ser. No. 556,263, filed June 9, 1966, now U.S. Pat. No. 3,585,200.

This invention relates to novel bis(semicarbazides) and derivatives thereof; also to methods of preparation of these compounds.

COMPOSITIONS

These new compositions of matter are the 4,4'-alkylene bis(semicarbazides),

I. 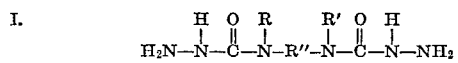

where: R" is an alkylene biradical having 2 to 12 carbon atoms and R and R' are hydrogen, alkyl, cycloalkyl, aralkyl, aryl, or heterocyclic radicals. R and R' may together form an R" alkylene biradical.

Certain new derivatives are:

II. 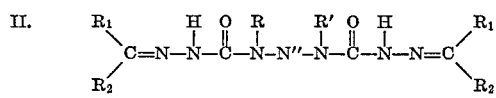

where: $R_1$ and $R_2$ have the aforesaid definition of R and R'.

III. 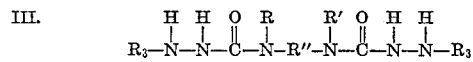

IV. 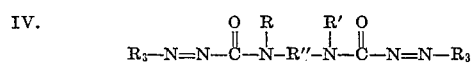

V. 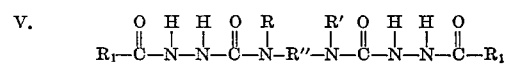

VI. 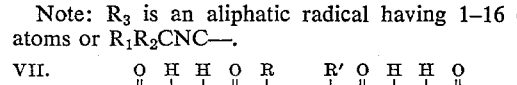

Note: $R_3$ is an aliphatic radical having 1–16 carbon atoms or $R_1R_2CNC—$.

VII. 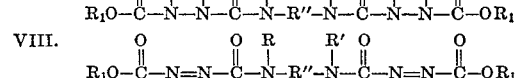

VIII. 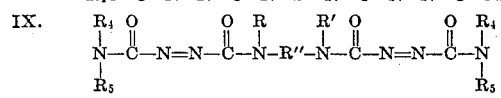

IX. 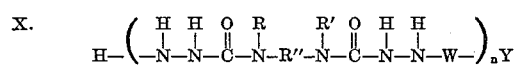

X. 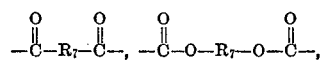

where:

W is a biradical selected from the class consisting of $$-\overset{O}{\overset{\|}{C}}-R_7-\overset{O}{\overset{\|}{C}}-, \quad -\overset{O}{\overset{\|}{C}}-O-R_7-O-\overset{O}{\overset{\|}{C}}-,$$

and

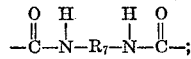

Y is a radical selected from the class consisting of —Cl, —OH, —$ON_a$, —$NH_2$, —$OR_6$,

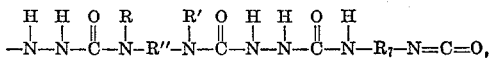
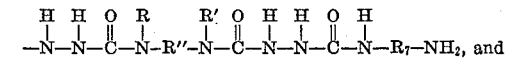
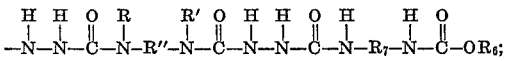

R" is an alkylene biradical having 2–12 carbon atoms;
R and R' are radicals selected from the class consisting of hydrogen, alkyl, cycloalkyl, aryl, aralkyl and heterocyclic;
R and R' may together form an R" alkylene biradical;
$R_6$ is a lower alkyl radical;
$R_7$ is a biradical selected from the class consisting of aliphatic and aromatic; and n is an integer.

XI. 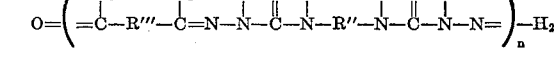

where: R'" is an aliphatic, aromatic or heterocyclic biradical; and n is an integer such that XI is a solid polymer.

Formulas I, III, V and VII can be combined in a single formula as follows:

XII. 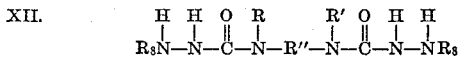

where:

R" is an alkylene biradical having 2–12 carbon atoms;
$R_8$ is a radical selected from the class consisting of hydrogen, aliphatic having 1–16 carbon atoms,

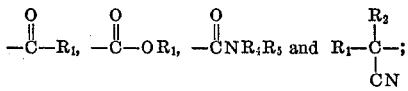

R, R', $R_1$, $R_2$, $R_4$ and $R_5$ are radicals selected from the class consisting of hydrogen, alkyl, cycloalkyl, aryl, aralkyl and heterocyclic; and R and R' may together form an R" alkylene biradical.

Formulas IV, VI, VIII and IX can be combined in a single formula as follows:

XIII. 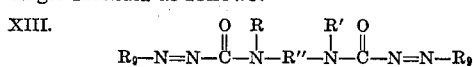

where:

R" is an alkylene biradical having 2–12 carbon atoms;
$R_9$ is a radical selected from the class consisting of aliphatic having 1–16 carbon atoms,

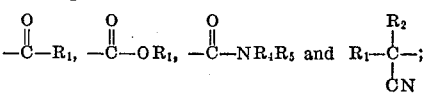

R, R', $R_1$, $R_2$, $R_4$ and $R_5$ are radicals selected from the class consisting of hydrogen, alkyl, cycloalkyl, aryl, aralkyl, and heterocyclic; and
R and R' may together form an R" alkylene biradical.

The term "alkylene biradical" is illustrated by: ethylene radical, —$CH_2CH_2$—; propylene radical, $$—CH_2CH_2CH_2—;$$

and isopropylene,

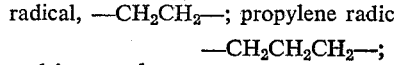

R, R', $R_1$, $R_2$, $R_4$ and $R_5$ are radicals which are one or a mixture of hydrogen, alkyl, cycloalkyl, aralkyl, aryl and heterocyclic. Commonly alkyl will have 1–30 carbon atoms. The lower alkyls, e.g., 1–6 carbon atoms, are more readily available. Cycloalkyl includes rings having 3 or more carbons and also condensed rings; illustrative are the 5–6 carbon atom single rings and the 10 carbon condensed ring decalinyl radical. Cycloalkyl includes cycloalkylalkyl. Aryl and aralkyl include single and condensed ring radicals. The phenyl, phenalkyl, naphthyl and naphthalkyl radicals are more readily available. Heterocyclic is intended to be taken in its broadest sense; however, the 3–6 member rings including nitrogen and/or oxygen are most readily available.

While $R_3$ is any aliphatic radical having 1–16 carbon atoms, commonly it is a lower alkyl radical.

Commonly, $R_7$ will be aliphatic having 1–16 carbon atoms and typically will be alkylene having 2–12 carbon atoms; or $R_7$ will be phenylene.

The I compounds are very useful difunctional chemical intermediates. They form polymers with diacid chlorides, bis chloroformates, diisocyanates, diketones, dialdehydes, and other di- and polyfunctional monomers. They can be converted to free radical generating compounds useful for initiating polymerization of vinyl monomers; curing resins and elastomers; and reaction catalysts. They can also be converted to gas generating compounds useful for making polymer foams and sponges. Semicarbazides are used in such applications as; reducing agents, identification of ketonic and aldehydes; separation of ketonic hormones and flavoring agents; antioxidants for preventing discoloration of phenols and aromatic amines; sensitizers for photographic dyes; photographic developers; polymerization inhibitors for monomers; synthesizing heterocyclic compounds; insecticides, pharmaceuticals; disinfectants; fungicides; and many others. They are also very useful as chemical intermediates for synthesizing compounds for an unlimited number of applications, many of which would be very difficult to prepare from other intermediates.

The IV, VI, VIII, and IX compounds are free radical generators useful as: polymerization initiators; curing agents; catalyst for reactions catalyzed by free radicals; and reactants in free radical chemical reactions. They also evolve copious quantities of gas on thermal and activated decompositions and are thus very useful blowing agents for producing foamed polymers. Moreover they are very versatile chemical intermediates, particularly useful for synthesizing heterocyclic compounds by their ready ability to undergo the Diels Alder reaction with conjugated dienes. These compounds are also selective dehydrogenating agents.

The II, III, V, and VII compounds are useful as chemical intermediates for preparing the IV, VI, VIII, and IX compounds.

The X and XI products are novel polymers which can be used in a variety of applications where polymers are generally used such as in molded products, fibers, etc.

PREPARATION

According to the present invention, 4,4'-alkylene bis (1-acylsemicarbazides), V, are produced by treating 2-substituted-$\Delta^2$,1,3,4-oxadiazolin-5-ones, XIV with primary and secondary diamines at 50° to 130° C. according to the following equation:

XIV.

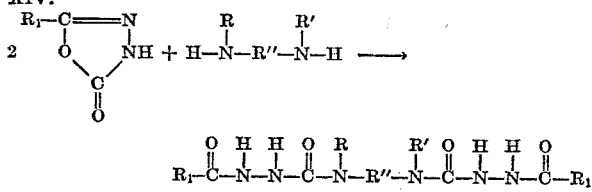

V.

The preferred temperature range for the reaction is 80° to 115° C. and the preferred solvent is water. All of the common organic solvents, excluding amines and ketones, can also be used. These include: aromatic hydrocarbons like benzene, toluene, and xylene; alcohols such as ethyl alcohol; ethers; esters; aliphatic hydrocarbons; chlorinated hydrocarbons; and any other solvent that does not react with the XIV compounds and the diamines and that is a solvent for both the XIV compounds and the diamines at the reaction temperature. The V compounds are readily isolated form the reaction mixture since they are considerably more insoluble in the reaction solvent than the reactants.

The preparation of the XIV compounds is disclosed in application Ser. No. 440,587, now abandoned, filed Mar. 17, 1965, by Sheppard, Korczykowski and MacLeay, of common assignment with the instant application.

The V compounds are readily hydrolyzed to the diacid salts of the I compounds in near quantitative yields by heating with aqueous mineral acids as illustrated by the following equation:

$$V + HX + H_2O \xrightarrow{\Delta}$$

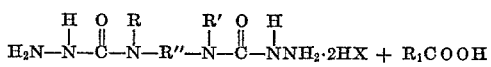

The preferred mineral acids are hydrochloric and sulfuric acids. The preferred reaction temperature is the refluxing temperature of the aqueous mineral acid.

The V compounds are readily oxidized to the corresponding VI compounds with a variety of oxidizing agents of which aqueous chlorine is preferred:

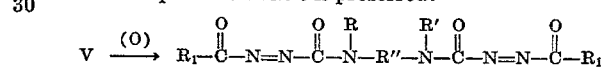

Other oxidizing agents that can be used include potassium permanganate, lead tetraacetate, ammonium nitrate, nitric acid, bromine, and the oxides of silver and mercury. One of the preferred methods involves the passing of chlorine gas into a stirred mixture of the V compound in a mixture of water and methylene chloride at 0° to 10° C. The VI compound dissolves in the methylene chloride layer which is separated, washed, dried, and stripped to isolate the VI product. The reaction temperature preferably should not exceed about 30° C.

The oxidation of the III compounds to the IV compounds, and the VII compounds to the VIII compounds are carried out in like manner.

The IX compounds are readily obtained from the VIII compounds by treatment with primary and secondary amines including ammonia. This reaction proceeds at room temperature in most cases. The presence of excess amine and also mild heating will promote reaction in cases of more refractory VIII compounds:

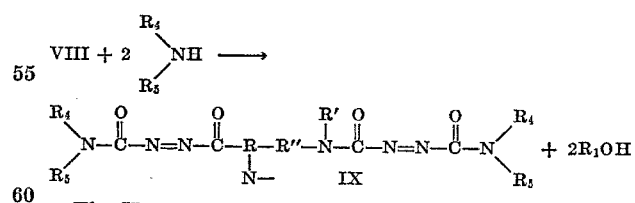

The II compounds are readily obtained by treating the I compounds with ketones and aldehydes in water and ethanol. Heating is sometimes required although most reactions proceed at room temperature. In most cases the I diacid salts are used. In these instances, a base is usually employed such as sodium carbonate, sodium hydroxide, sodium acetate, etc. For most reactions, sodium acetate is preferred:

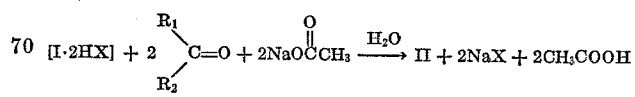

The II compounds generally have limited solubility in water and are easily isolated from the reaction mixtures.

The III compounds can be synthesized by a variety of methods. For the cases where the $R_3$ of the III compounds has a tertiary carbon directly linked to the nitrogen, addition of suitable reagents across the $>C=N-$ bond of the II compounds is the preferred method of synthesis. The preferred reagent is hydrogen cyanide. With this reagent, the reaction proceeds at room temperature to 100° C. Excess hydrogen cyanide is usually desirable and if solution of the II compound is not obtained, a solvent such as ethyl alcohol is employed:

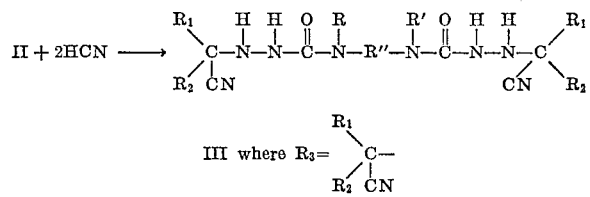

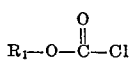

The II compounds can be treated with hydrogen in the presence of catalysts such as platinum, palladium, ruthenium, rhodium, and nickel to obtain III compounds where $R_3$ is a primary or secondary hydrocarbon radical.

These hydrogenation reactions are preferably carried out in polar solvents such as ethyl alcohol and at room temperature to 60° C. under 40 to 60 lbs. per square inch of hydrogen pressure. The amount of catalyst used is preferably in the range of 0.01 to 1.0% of the II compound:

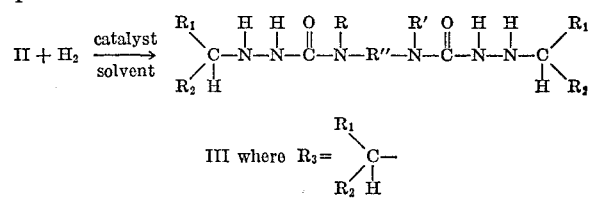

Other methods of synthesizing III compounds include the reaction of I compounds with alkyl halides, usually in the presence of a base.

The VII compounds are prepared by treating the I compounds with chloroformates, $$R_1-O-\overset{O}{\underset{\|}{C}}-Cl$$

The reaction is preferably carried out in water at 0° C. to 20° C. in the presence of a base, preferably sodium carbonate:

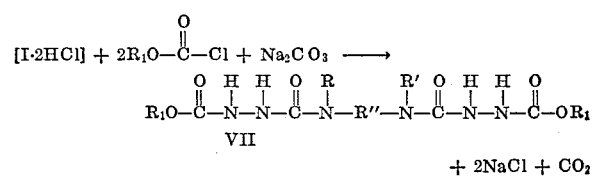

$$+ 2NaCl + CO_2$$

The preferred method involves adding the chloroformate slowly to a stirred and cooled solution of the I compound in water, with an equivalent amount of sodium carbonate either present or added simultaneously, at 0°–15° C. Most of the VII compounds have limited water solubility and are easily isolated by filtration. Water soluble VII compounds can be extracted with suitable solvents or taken up in a suitable solvent after evaporating off the water to separate them from the inorganic salts.

The novel polymers, X, can be prepared from the I compounds by a variety of methods. Generally, the methods involved are modifications of the well known procedures used to make polymers from diamines, dihydrazines, and diacid hydrazides. These include reacting the I compounds with compounds containing two or more functionalities that react rapidly with the hydrazine portion of the I compounds. Such compounds are diacid chlorides, bischloroformates, diisocyanates, diketones, dialdehydes, and other di- and polyfunctional compounds.

One of the preferred methods of preparing the X polymers is by the interfacial technique as described hereinafter in Examples 5 and 6. In this method, two immiscible solvents are employed. The I compound should be very soluble in one of these solvents and possess limited solubility in the other. The di- or polyfunctional comonomer should be soluble in the latter solvent and possess limited solubility in the solvent containing the dissolved I compound. A base that is preferably soluble in the solvent for the I compound is also required. Two solutions are prepared, one containing the I compound and the base in one solvent and the other containing the di- or polyfunctional comonomer in the other solvent. On mixing, polymer formation occurs at the interface between the two immiscible solvents. With very active functionalities, polymer formation is very rapid even at temperatures below room temperature. With less active functionalities, heating may be required.

The preferred solvent for the I compounds and the base is water and the preferred solvents for the di- and polyfunctional comonomers are halogenated hydrocarbons such as chloroform, methylene chloride, carbon tetrachloride, perchloroethylene, 1,2-dichloroethane, 1,1,1-trichloroethane, etc. and aromatic hydrocarbons such as benzene, toluene, and xylene.

Other methods for preparing the X polymers include the mixing of I compounds with di- and polyfunctional comonomers under vacuum to remove any formed gas of reaction such as hydrogen chloride when the functionality of the comonomer is an acid chloride. Usually, an inert gas is also used to purge out the formed gases or low boiling products such as water when the functionality is a ketone or aldehyde. Heating is also required near the end of the polymerizations even with the more active functionalities in order to obtain high molecular weights in some cases. Temperatures may range from below room temperature to above 200° C.

EXAMPLE 1

Preparation of 4,4'-ethylene bis(1-benzoylsemicarbazide) (V where $R_1=C_6H_5$ and $R=R'=$hydrogen and $R''=-CH_2CH_2-$)

A 500 ml. flask equipped with a reflux condenser was charged with 50.0 grams of 2-phenyl-$\Delta^2$,1,3,4-oxadiazolin-5-one (0.309 mole), 9.0 grams of ethylene diamine (0.1515 mole), and 250 ml. of water. As the reaction mixture was heated to reflux, complete solution occurred. The 4,4'-ethylene bis(1-benzoylsemicarbazide) began to precipitate from the reaction solution upon refluxing. The reaction mixture was then cooled to room temperature and filtered. The white solid filter cake was washed with water and dried to obtain the 4,4'-ethylene bis(1-benzoylsemicarbazide), M.P. 262–264° C.

The following yields were obtained using the refluxing times shown:

| Percent yield: | Refluxing time, hours |
|---|---|
| 49.5 | 3.0 |
| 59.4 | 5.0 |
| 68.6 | 13.5 |
| 76.5 | 21.5 |

The reaction proceeds fairly rapidly in the beginning and then gradually slows down as the reactants become more dilute. The only other products isolated from the reaction mixture were 4-($\beta$-aminoethyl)-1-benzoylsemicarbazide, M.P. 205°–207° C., and unreacted 2-phenyl-$\Delta^2$,1,3,4-oxadiazolin-5-one. Since the former is the intermediate formed prior to the formation of 4,4'-ethylene bis(1-benzoylsemicarbazide), the reaction is suited for a continuous process wherein the yields are improved and the reaction times shortened considerably by recycling the mother liquors. The structure of the 4,4'-ethylene bis(1-benzoylsemicarbazide) was confirmed from its infrared spectrum and its chemical reactivity.

EXAMPLE 2

Preparation of 4,4′,4,4′-diethylene bis(1-benzoylsemicarbazide) (V where $R_1=C_6H_5$ and R and $R'=R''=-CH_2CH_2-$)

A 1,000 ml. flask equipped with a reflux condenser was charged with 32.4 gm. (0.2 mole) of 2-phenyl-$\Delta^2$,1,3,4-oxadiazolin-5-one, 8.6 grams (0.1 mole) of piperazine, and 400 ml. of water. As the reaction mixture was heated to reflux, complete solution occurred. The 4,4′,4,4′-diethylene bis(1-benzoylsemicarbazide) began to precipitate from the reaction solution upon refluxing. The reaction mixture was filtered at 80° C., the white solid filter cake washed with water and dried to obtain the product, M.P. 277–279° C. dec. (with decomposition).

The following yields were obtained using the refluxing times shown:

| Percent yield: | Refluxing time, hours |
| --- | --- |
| 62.6 | 9.0 |
| 69.5 | 13.25 |

The only other products isolated from the reaction mixture were 4,4-aminobisethylene-1-benzoylsemicarbazide (the intermediate product) and unreacted 2-phenyl-$\Delta^2$,1,3,4-oxadiazolin-5-one. Thus higher yields with shorter reaction times are possible by recycling the mother liquors. The structure proofs were confirmed by infrared spectroscopy and chemical reactivity.

EXAMPLE 3

Preparation of 4,4′,4,4′-diethylenebis(semicarbazide hydrochloride) (dihydrochloride salt of I where R and $R'=R''=-CH_2CH_2-$)

A 2 liter flask equipped with a reflux condenser was charged with 26.8 grams (0.0654 mole) of 4,4′,4,4′-diethylenebis(1-benzoylsemicarbazide) (from Example 2), and 650 ml. of 10% hydrochloric acid. The resultant suspension was refluxed until a clear solution was obtained (about 3 hours). The solution was then cooled and the precipitated and dissolved benzoic acid extracted with ether. The ether extracts were dried and stripped to obtain the theoretical amount of benzoic acid (0.131 mole).

The acidic aqueous layer was concentrated until solids began to deposit and then cooled in an ice bath. The resultant cold mixture was filtered and pressed as dry as possible. The filter cake was then washed with cold ethyl alcohol and dried. The ethyl alcohol caused more product to precipitate from the filtrate which was collected in a filter, washed with fresh ethyl alcohol and dried. The combined dried products were white in color, weighed 12.6 grams, melting at 235° C. with decomposition. This corresponds to a 70% yield of 4,4′,4,4′-diethylenebis(semicarbazide hydrochloride).

Structure proofs were obtained by infrared spectroscopy, chemical reactivity, and equivalent weight determination.

EXAMPLE 4

(A) Preparation of 4,4′-ethylene bis(semicarbazide) hydrochloride) (dihydrochloride salt of I where $R=R'=$hydrogen and $R''=-CH_2CH_2-$)

A 250-ml. flask equipped with a reflux condenser was charged with 3.0 grams of 4,4′-ethylene bis(1-benzoylsemicarbazide) (from Example 1) and 100 ml. of 10% hydrochloric acid. The reaction mixture was refluxed for 3¾ hours. The resultant clear solution was cooled and the dissolved and crystallized benzoic acid extracted with ethyl ether. The ether extracts were dried and stripped to obtain 1.9 grams of benzoic acid (100% yield). The acidic aqueous layer was concentrated until solids began to deposit and then cooled in an ice bath. The mixture was filtered, washed with cold water, and dried to obtain 1.0 g. of white product, M.P. 222° C. with decomposition. An equivalent weight determination showed that the product contained 98.5% 4,4′-ethylene bis (semicarbazide hydrochloride). Its infrared spectrum was in accord with this structure.

The acidic aqueous filtrate and washings were combined and then stripped to dryness to obtain 0.95 gram of solid residue that gave an infrared spectrum identical to the above product. The yield of 4,4′-ethylene bis(semicarbazide hydrochloride) was qantitative.

(B) Conversion of 4,4′-ethylenebis (semicarbazide hydrochloride) to 4,4′-ethylenebis(semicarbazide) (I)

To a cold solution of 1.0 gram (.004 mole) of the 98.5% pure 4,4′-ethylenebis(semicarbazide hydrochloride) in 10 ml. of water was added 0.64 gram (0.008 mole) of a 50% solution of sodium hydroxide in water. The resultant clear solution was flash evaporated to obtain a white solid residue weighing 1.15 grams composed of a mixture of sodium chloride and 4,4′-ethylenebis(semicarbazide). This solid mixture was triturated with warm isopropyl alcohol and filtered. The filtrate was evaporated under vacuo to obtain the pure 4,4′-ethylenebis(semicarbazide) as a white solid, M.P. 158.0–158.5° C. Its infrared spectrum was in agreement with the proposed structure and it was also identical to the sodium chloride mixture isolated above. Since sodium chloride is transparent in the infrared region, a quantitative yield of 4,4′-ethylenebis(semicarbazide) was obtained.

EXAMPLE 5

Polymerization of 4,4′-ethylenebis(semicarbazide) with fumaroyl chloride

A solution was prepared by dissolving 2.49 grams (0.01 mole) of 4,4′-ethylene bis(semicarbazide hydrochloride) (from Example 4), 1.6 grams (0.02 mole) of 50% sodium hydroxide, 1 gram of sodium chloride, and 1.59 grams (0.015 mole) of sodium carbonate in 25 ml. of water. Another solution was prepared by dissolving 1.53 grams (0.01 mole) of fumaroyl chloride in 25 ml. of toluene.

The latter solution was poured onto the former solution at room temperature. Polymer formation occurred at the interface immediately. The two immiscible solutions were then stirred for 10 minutes. A slight exotherm was observed during this time. The resultant precipitated polymer was then filtered, washed well with water and acetone, and dried. It weighed 1.63 grams (64% yield). The very light yellow color polymer did not melt up to 300° C. although some discoloration occurred at around 260° C. It was insoluble in all organic solvents indicating very high molecular weight. The infrared spectrum indicated a polymeric material containing amide carbonyl bonds and N—H bonds and was in agreement for a polymer structure having the following repeating units:

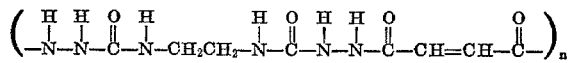

EXAMPLE 6

Polymerization of 4,4′-ethylenebis)semicarbazide) with butylene bis(chloroformate)

(A) An aqueous solution was prepared as in Example 5 and a toluene solution was prepared as in Example 5 using 2.15 grams (0.01 mole) of butylene bis(chloroformate) in place of the fumaroyl chloride. The two solutions were mixed and heated to 60° C. where polymeric fibers could be drawn in a continuous manner from the interface. The two solutions were then stirred for 10–15 minutes, cooled, and filtered. The polymeric product was washed well with water and acetone and then dried. The gray-white product melted at 210° C. and its infrared spectrum indicated a polymeric material and was in agreement with repeating units of the following structure:

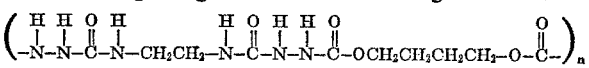

(B) When methylene chloride was used as the solvent for butylene bis(chloroformate) instead of toluene, and more dilute solutions employed, the polymer obtained had

EXAMPLE 7

Preparation of N,N'-ethylene bis(2-cyano-2-propylazoformamide)

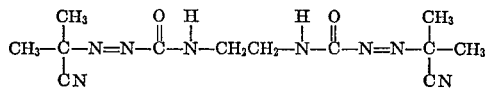

IV where $R_3=CH_3-\underset{\underset{CN}{|}}{\overset{\overset{CH_3}{|}}{C}}-$; R=R'=hydrogen; and $R''=CH_2CH_2-$ (A) 4,4'-ethylene bis(1-isopropylidinesemicarbazide)

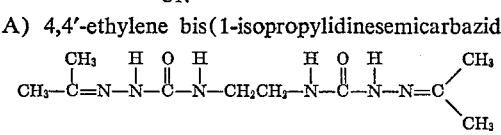

II where R=R'=H; $R''=-CH_2CH_2-$; and $R_1=R_2=-CH_3$ 4,4'-ethylene bis(semicarbazide hydrochloride), 8 grams, was dissolved in 100 ml. of water with 5.4 grams of sodium acetate. The resultant solution was stirred while 4 grams of acetone was added. The slurry was then stirred for 30 minutes, cooled to 10° C., and filtered. The solid was washed with water and dried to obtain 8.2 grams (97% yield) of white product, M.P. 250–252° C. whose infrared spectrum was in accord with the structure of 4,4'-ethylene bis(1-isopropylidenesemicarbazide).

(B) 4,4'-ethylene bis [1-(2-cyano-2-propyl) semicarbazide]

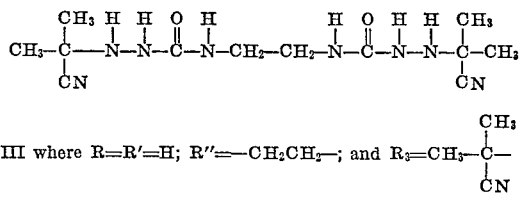

III where R=R'=H; $R''=-CH_2CH_2-$; and $R_3=CH_3-\underset{\underset{CN}{|}}{\overset{\overset{CH_3}{|}}{C}}-$ A pressure bottle was charged with 5 grams of 4,4'-ethylene bis(1-isopropylidenesemicarbazide), 40 ml. of liquid hydrogen cyanide, and 20 ml. of ethyl alcohol. The bottle was sealed and heated at 80° to 90° C. for 24 hours. After cooling, the bottle was opened and the contents transferred to a distilling flask where the excess hydrogen cyanide and the ethyl alcohol were distilled off. The residue contained 6.0 grams of crude 4,4'-ethylene bis [1-(2-cyano-2-propyl) semicarbazide] (99% yield) as evidenced by its infrared spectrum. The product, white in color, was used in the next step without further purification.

(C) N,N'-ethylene bis (2-cyano-2-propylazoformamide)

The 6.0 grams of product from above was stirred with 100 ml. of methylene chloride and 50 ml. of 1 N sulfuric acid at 5–10° C. while a saturated aqueous solution of potassium permanganate was added until the color of the permanganate was no longer discharged. The resultant mixture was stirred for 15 minutes and then filtered. The two layers were separated and the aqueous layer extracted with fresh methylene chloride. The combined methylene chloride layers were washed with saturated sodium bicarbonate, dried over anhydrous sodium sulfate and filtered. The methylene chloride solvent was removed under vacuo to obtain 5.5 grams (95% yield) of crude N,N'-ethylene bis(2-cyano-2-propylazoformamide). Recrystallization from benzene gave 4.3 grams of product that assayed 98.5% for N,N'-ethylene bis(2-cyano-2-propylazoformamide) by iodometric titration. The product is a yellow solid, 141–143° C., and its infrared spectrum was in accord with its structure.

EXAMPLE 8

Polymerization of styrene with N,N'-ethylene bis(2-cyano-2-propylazoformamide)

A solution of styrene containing $2.5 \times 10^{-4}$ moles per deciliter of N,N'-ethylene bis(2-cyano-2-propylazoformamide) was heated at 100° C. and the change in density, which is a measure of polymer formation, was followed by means of a dilatometer to measure polymerization rates at 5% and 10% conversion to polystyrene. The rates obtained at 5% and 10% conversion were $6.47 \times 10^{-3}$ and $6.27 \times 10^{-3}$ moles per liter per minute respectively. Without the N,N'-ethylene bis(2-cyano-2-propylazoformamide) the 5 and 10% rates were $2.81 \times 10^{-3}$ moles per liter per minute. Thus, this azo compound initiated the polymerization of styrene at 100° C.

EXAMPLE 9

Curing an unsaturated polyester-styrene resin with N,N'-ethylene bis(2-cyano-2-propylazoformamide)

An unsaturated polyester resin was made by reacting maleic anhydride (1.0 mole), phthalic anhydride (1.0 mole), and propylene glycol (2.2 moles) until an acid number of 45–50 was obtained. To this was added hydroquinone at a 0.013% concentration. 7 parts of this unsaturated polyester was diluted with 3 parts of monomeric styrene to obtain a homogenous blend having a viscosity of 13.08 poises and a specific gravity of 1.14. To 20 grams of this blend was added 0.16 gram of N,N'-ethylene bis(2-cyano-2-propylazoformamide) and the resultant composition placed in a constant temperature bath at 240° F. The internal temperature was recorded as a function of time and a peak exotherm of 440° F. was reached in 10.3 minutes indicating an excellent cure of the unsaturated polyester-styrene resin blend had occurred. The resultant cured material was very hard. Without an initiator, no cure of this resin blend occurred after 30 minutes at 240° F.

EXAMPLE 10

N,N'-ethylene bis(2-cyano-2-propylazoformamide) as a blowing agent for producing vinyl foams The following formulation was prepared and blended together in a Hobart mixer:

| | Parts |
|---|---|
| Polyvinyl chloride, dispersion type resin, (Firestone 605) | 100.0 |
| Dioctyl phthalate | 62.0 |
| Butyl octyl phthalate | 30.0 |
| Epoxy plasticizer (Rohm & Haas G–62) | 5.0 |
| Titanium dioxide | 5.0 |
| Dibasic lead phosphite (National Lead's Dyphos P.G.) | 3.0 |
| N,N'-ethylene bis(2 - cyano - 2 - propylazoformamide) | 2.5 |

A 40-mil casting was applied on an aluminum plate and heated in an oven at 200° C. for 2 minutes. The resultant white foam had fine cell structure with a density of 24.6 lb./cu. ft.

EXAMPLE 11

Preparation of 4,4'-ethylene bis(semicarbazone) of 1,3 diphenylacetone

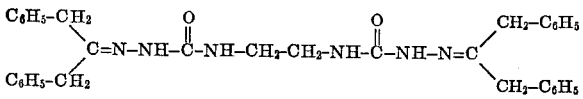

(II where R=R'=hydrogen, $R''=-CH_2CH_2-$, and $R_1=R_2=C_6H_5CH_2-$)

To a solution of 2.3 g. (.0185 eq.) 4,4'-ethylene bis (semicarbazide hydrochloride), from Example 4, and 1.4 g. (.017 mole) sodium acetate in 25 ml. water was added 4.0 g. (.019 mole) 1,3-diphenylacetone and 10 ml. ethanol. The solution was stirred ½ hour during which time precipitation occurred, cooled to 5° C. and filtered. The product was a white solid melting at 222-227° C. with decomposition. A 91% yield was obtained and the infrared spectrum was in agreement with the structure of the expected product.

EXAMPLE 12

Preparation of 4,4'-dodecylene bis(1-benzoylsemicarbazide) (V where $R_1=C_6H_5$ and R and R'=hydrogen and $R''=-(CH_2)_{12}-$)

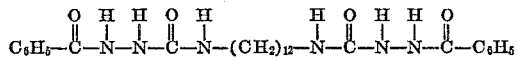

A 250 ml. flask equipped with a reflux condenser was charged with 8.1 grams (.05 mole) of 2-phenyl-$\Delta^2$,1,3,4-oxadiazolin-5-one, 5.0 grams (0.025 mole) of 1,12-diaminododecane, and 130 ml. of water. As the stirred reaction mixture was heated to reflux, almost complete solution occurred and then a solid product began to precipitate upon continued refluxing. After 13 hours of refluxing, the reaction mixture was cooled and filtered. The white solid filter cake was washed with water and dried to obtain 11.6 grams of product, M.P. 168-170° C. Its infrared spectrum was in agreement with the structure of 4,4'-dodecylene bis(1-benzoylsemicarbazide). The yield was 88.5%.

EXAMPLE 13

Preparation of N,N'-ethylene bis(benzoylazoformamide)

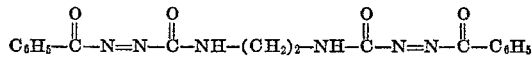

(VI where $R_1=C_6H_5$ and R and R'=hydrogen and $R''=-CH_2-CH_2-$)

A slurry of 4 g. (0.0208 eq.) 4,4'-ethylene bis (1-benzoylsemicarbazide) (from Example 1) in 150 ml. of methylene chloride and 50 ml. of water was cooled to 0° C. and 1.49 g. (0.021 mole) chlorine passed into the system. The reaction was stirred 15 minutes at 0-5° C., the methylene chloride layer separated and the aqueous suspension extracted with another 100 ml. methylene chloride. The methylene chloride layers were combined, washed with sodium bicarbonate solution, then with saturated sodium chloride solution, and dried over anhydrous sodium sulfate. The methylene chloride was stripped off and the crude residue slurried in pentane and filtered to obtain an orange solid.

Yield=1.3 g., yield=33%, M.P., 147-150° C. dec. Assay=98.0% by iodometric titration.

The infrared spectrum is in agreement with the proposed structure. The product is a high temperature free radical generator that evolved 59 cc. (STP) of gas per gram after one hour at 200° C. from a dioctyl phthalate medium. It is also an oxidizing agent as evidenced by the fact that it quantitatively oxidized iodide ion to free iodine.

EXAMPLE 14

Preparation of N,N',N,N'-diethylene bis(benzoylazoforamide)

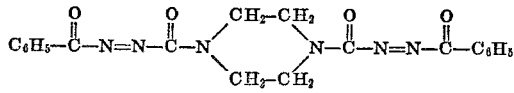

(VI where $R_1=C_6H_5$ and R and $R''=R''=-CH_2CH_2-$)

A slurry of 4 g. (0.0195 eq.) 4,4',4,4'-diethylene bis(1-benzoylsemicarbazide) (from Example 2) in 150 ml. methylene chloride and 50 ml. of water was cooled to 0° C. and 1.55 g. (0.0218 mole) chlorine passed into the system. The reaction was stirred 3 hours at 0-5° C., the mehylene chloride layer separated and the aqueous suspension extracted with another 100 ml. methylene chloride. The methylene chloride layers were combined, washed with sodium bicarbonate solution, then with saturated sodium chloride solution and dried over anhydrous sodium sulfate. The methylene chloride was stripped off and the crude residue slurried in pentane and filtered to obtain an orange solid.

Yield=1.0 g., yield=25% M.P., 158-162 dec. Assay=81.7% by iodometric titration.

The infrared spectrum is in agreement with the proposed structure. The product is a high temperature free radical generator that evolved 49 cc. (STP) of gas per gram after one hour at 200° C. from a dioctyl phthalate medium. It is also an oxidizing agent that oxidized iodide ion to free iodine.

EXAMPLE 15

Preparation of 4,4',4,4'-diethylene bis(1-carbisopropoxy-semicarbazide)

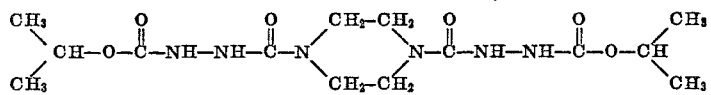

(VII where R and $R''=R''=-CH_2CH_2-$, and $R_1=(CH_3)_2CH-$)

To a solution of 13.8 g. (0.1 eq.) 4,4',4,4'-diethylene bis(semicarbazide hydrochloride), from Example 3, and 5.5 g. (.05 mole) sodium carbonate in 100 ml. water was added over a ½ hour period with vigorous stirring, 14.6 g. (0.12 mole) isopropyl chloroformate and 5.5 g. (.05 mole) sodium carbonate. The isopropyl chloroformate and sodium carbonate were added at approximately the same rate. No external cooling was employed and the reaction temperature rose from 20 to 35° C. After the exotherm had subsided the reaction was stirred an additional 1½ hours, filtered, and the filter cake dried in a vacuum oven. The product was a white solid melting at 275 to 282° C. and was obtained in 95% yield. The infrared spectrum was in agreement with the structure of the expected product.

EXAMPLE 16

Preparation of 4,4'-ethylene bis(1-carbisopropoxy-semicarbazide)

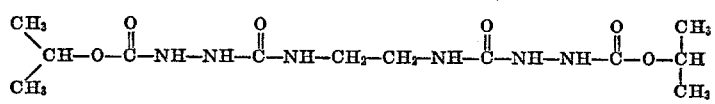

(VII where R=R'=hydrogen, $R''=CH_2CH_2-$, and $R_1=(CH_3)_2CH-$)

To a solution of 12.5 g. (0.1 eq.) 4,4'-ethylene bis(semicarbazide hydrochloride) from Example 4 and 5.5 g. (.05 mole) sodium carbonate in 100 ml. water was added over a ½ hour period with vigorous stirring, 14.6 g. (0.12 mole) isopropyl chloformate and 5.5 g. (.05 mole) sodium carbonate. The isopropyl chloroformate and sodium carbonate were added at approximately the same rate. No external cooling was employed and the reaction temperature rose from 20 to 35° C. After the exotherm had subsided the reaction was stirred an additional 1½ hours, filtered, and the filter cake dried in a vacuum oven. The product was a white solid melting at 202-207° C. and was obtained in 65% yield. It is partially soluble in water. The infrared spectrum was in agreement with the structure of the expected product.

EXAMPLE 17

Preparation of N,N',N,N'-diethylene bis(carbisopropoxyazoformamide)

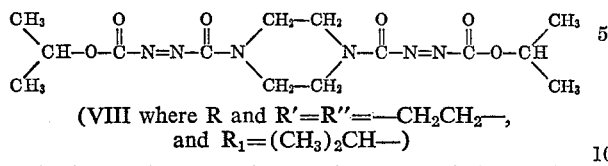

(VIII where R and R'=R''=—CH$_2$CH$_2$—, and R$_1$=(CH$_3$)$_2$CH—)

A slurry of 18.4 g. (.098 eq.) 4,4',4,4'-diethylene bis (1-carbisopropoxysemicarbazide), from Example 15, 200 ml. methylene chloride and 100 ml. water was cooled to 5° C. and 7.3 g. (.103 mole) chlorine passed into the system over a ½ hour period. The methylene chloride layer was separated, washed four times with saturated NaHCO$_3$ solution, once with saturated NaCl solution, dried over anhydrous sodium sulfate, filtered, and the methylene chloride stripped off. The product was an orange solid melting at 189 to 193° C. with decomposition and was obtained in 60% yield. The material assayed 97.6% by iodometric titration, and its infrared spectrum was in agreement with the structure of the expected product. Filtration of the original aqueous layer resulted in recovery of 40% of the starting 4,4',4,4'-diethylene bis(1-carbisopropoxysemicarbazide).

The N,N',N,N'-diethylene bis(carbisopropoxyazoformamide) is a high temperature free radical generator that evolved 61 cc. (STP) of gas per gram after 30 minutes at 200° C. from a dioctyl phthalate medium. It is also an oxidizing agent that oxidized iodide ion to free iodine.

EXAMPLE 18

Preparation of N,N'-ethylene bis(carbisopropoxyazoformamide)

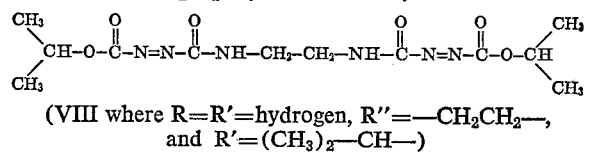

(VIII where R=R'=hydrogen, R''=—CH$_2$CH$_2$—, and R'=(CH$_3$)$_2$—CH—)

A slurry of 18.4 g. (.098 eq.) 4,4',4,4'-diethylene bis isopropoxysemicarbaxide), from Example 16, 150 ml. methylene chloride and 100 ml. water was cooled to 5° C. and 6.3 g. (.088 mole) chlorine passed into the system over a ½ hour period. The methylene chloride layer was then separated, washed four times with saturated NaHCO$_3$ solution, once with saturated sodium chloride solution, dried over anhydrous sodium sulfate, filtered and the methylene chloride stripped off. The product was an orange solid melting at 105 to 109° C. with decomposition and was obtained in 96% yield. The material assayed 95.5% by iodometric titration and its infrared spectrum was in agreement with the structure of the expected product.

The product is a high temperature free radical generator that evolved 70 cc. (STP) of gas per gram after 30 minutes at 200° C. from a dioctyl phthalate medium. It is also an oxidizing agent that oxidized iodide ion to free iodine.

EXAMPLE 19

Preparation of N,N'-ethylene bis(carbamylazoformamide)

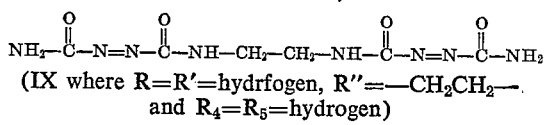

(IX where R=R'=hydrfogen, R''=—CH$_2$CH$_2$—. and R$_4$=R$_5$=hydrogen)

Ammonia gas was bubbled into a solution of 9.4 g. (.0274 mole) N,N'-ethylene bis(carbisopropoxyazoformamide), from Example 18, in 150 ml. methylene chloride until precipitation of the insoluble product ceased. There was a slight exotherm and the reaction temperature was controlled at 5–10° C. with an ice bath. The product, an orange solid, was isolated by filtration in 85% yield. The product assayed 91.6% by iodometric titration, decomposed gently at 185° to 225° C. and its infrared spectrum was in agreement with the structure of the expected product. It is a high temperature free radical generator that evolved 112 cc. (STP) of gas per gram after 30 minutes at 200° C. from a dioctyl phthalate medium. It is also an oxidizing agent that oxidized iodide ion to free iodine.

EXAMPLE 20

Preparation of N,N',N,N',-diethylene bis-(carbamylazoformamide)

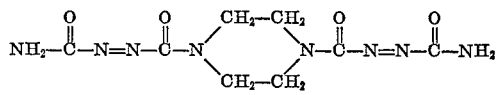

(IX where R and R'=R''=—CH$_2$CH$_2$—, and R$_4$=R$_5$=hydrogen)

Ammonia gas was bubbled into a solution of 6.5 g. (.0175 mole) N,N',N,N'-diethylene bis(carbisopropoxyazoformamide) in 150 ml. methylene chloride until precipitation of the insoluble product ceased. There was a slight exotherm and the reaction temperature was controlled at 5–10° C. with an ice bath. The product, an orange solid, was isolated by filtration in 71% yield. The product assayed 96.7%, by iodometric titration, decomposed gently at 189 to 204° C. and its infrared spectrum was in agreement with the structure of the expected product. It is a high temperature free radical generator and an exceptional blowing agent for foaming polymers that evolved 228 cc. (STP) of gas per gram after 2 minutes at 200° C. from a dioctyl phthalate medium. It is also an oxidizing agent that oxidized iodide ion to free iodine.

EXAMPLE 21

Preparation of a polyoxadiazole

Example 21 deals with the conversion of 4,4'-alkylene-bis (semicarbazide) polymers of Formula X. The polymer obtained in Example V from the interfacial polymerization of 4,4'-ethylenebis(semicarbazide) and fumaroyl chloride was heated at 230–250° C. for two hours under vacuo (20 mm. of Hg). The resultant light brown polymer was cooled to room temperature where the vacuum was relieved. It did not melt to 300° C. Its infrared spectrum, which was different from that of the starting polymer, had all of the bands reported for polyoxadiazoles by T. Unishi and M. Hasegawa, J. Polymer Sci. Part A. 3, 3191–3198 (1965). These bands were present at 1720 cm.$^{-1}$, 1600 cm.$^{-1}$, 1575 cm.$^{-1}$, 1165 cm.$^{-1}$, and 977 cm.$^{-1}$. The 1720 cm.$^{-1}$ band was not present in the starting polymer and the amide II band of the starting polymer at 1550 cm.$^{-1}$ was not present in the product. The infrared spectrum shows that the product is a polyoxadiazole and it is in agreement with the following structure, with bands at 985 cm.$^{-1}$ and 1650 cm.$^{-1}$ accounting for the unsaturation:

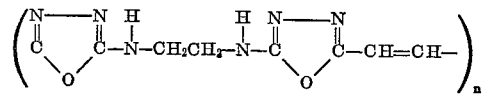

EXAMPLE 22

Polymerization of 4,4'-ethylenebis(semicarbazide) with tetramethyl-1,3-cyclobutanedione Example 22 deals with the formation of polymers from 4,4'-alkylenebis(semicarbazides) with diketones and/or dialdehydes to give polymers of the structure:

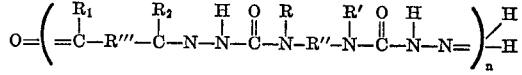

where R, R', R'', R$_1$ and R$_2$ have the same definitions as before and R''' is an aliphatic, aromatic heterocyclic bi-radical.

A solution was prepared by dissolving 0.8 gram (0.0032 mole) of 4,4'-ethylenebis(semicarbazide hydrochloride) (from Example 4) and 0.39 gram (.0047 mole) of sodium acetate in 13 ml. of water. Another solution was prepared by dissolving 0.45 gram (.0032 mole) of tetramethyl-1,3-cyclobutanedione (from Eastman Chemical Products, Inc.) in 20 ml. of ethanol. The two solutions were mixed at room temperature. The resultant clear solution was heated to reflux with stirring. It became cloudy at 65° C. After refluxing for 15 minutes, the resultant white suspension was stirred while it was allowed to cool slowly to room temperature and then filtered. The white solid product was washed with water and then with ethanol and dried. It weighed 0.67 gram and did not melt or discolor upon heating to 305° C. Its infrared spectrum was in agreement with a polymeric structure having the following repeating units:

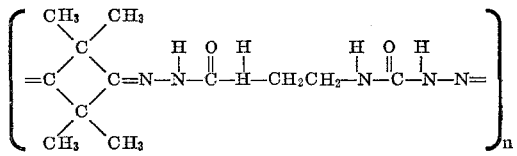

Thus having described the invention, what is claimed is:
1. 4,4'-ethylene bis(semicarbazide).

References Cited
UNITED STATES PATENTS
2,767,193   10/1956   Taub _____ 260—554 X OTHER REFERENCES
Lieber et al.: C. A. 57, (1962) pp. 5827–5828.

JOSEPH P. BRUST, Primary Examiner

U.S. Cl. X.R.
260—268 C, 464, 465 D, 465.4, 482 R, 78 UA, 77.5 C